May 5, 1925.

F. M. FURBER 1,536,091

ROTARY TRANSMISSION MEANS

Filed Feb. 19, 1920

INVENTOR
Frederick M. Furber
By his Attorney

Patented May 5, 1925.

1,536,091

UNITED STATES PATENT OFFICE.

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

ROTARY TRANSMISSION MEANS.

Application filed February 19, 1920. Serial No. 359,377.

*To all whom it may concern:*

Be it known that I, FREDERICK M. FURBER, a citizen of the United States, residing at Revere, in the county of Suffolk and State of Massachusetts, have invented certain Improvements in Rotary Transmission Means, of which the following description, in connection with the accompanying drawings, is a specification, like reference characters on the drawings indicating like parts in the several figures.

This invention relates to means for transmitting rotation, and more particularly, in some respects, to transmitting rotation to relatively high-speed shafts by which tools are carried for operating. By way of illustrating one practicable embodiment of the invention the latter is shown by the accompanying drawings in a form adapted for use in a machine for trimming the edges of shoe-soles, since it overcomes certain objectionable features that are common in such machines. It is not to be understood, however, that the invention is limited to such machine nor to the exact construction or organization shown, since it may well be put to other uses without sacrificing its advantageous features.

When, as in a sole-edge-trimming machine of the type shown, a rotary cutter is carried directly by a shaft that rotates at highspeed, it is necessary but difficult to minimize vibration thereof. One objectionable result of vibration is that the cutter forms irregularities in the work. The vibratory motion of the cutter arises from various causes in machines as heretofore constructed, among which causes are imperfect balance of a driving member such as a pulley, eccentricity of one member relatively to another with which it should be concentric, and repeated tightening and slackening of a driving belt as its lacing or other joint becomes seated on and unseated from its pulleys. Accordingly an object of the present invention is to provide for transmitting rotation to a tool-shaft without also transmitting pulsations and vibration to it. A feature of this aspect of the invention consists in mounting a tool-shaft and a pulley therefor in substantially coaxial relation, together with improved means connecting them to transmit rotation to the shaft and to dissipate vibration in such manner that the shaft will be immune from pulsations and vibrations affecting the pulley.

The machine shown is provided with a rotary tool-shaft and a pulley for transmitting rotation to it, but, instead of being arranged so that the shaft supports the pulley, they are sustained independently of each other by means constructed and arranged to prevent the transmission of pulsations and vibration.

Another object of the invention is to provide a self-balancing and self-centering clutch for the tool-shaft. The illustrated construction provides the self-balancing and self-centering features in a cone-clutch the driven member of which is always in balance with the tool-shaft, and the driving member of which is a floating ring which is centered and balanced by the driven member whenever the two are operatively coupled. Thus, while the balancing of the tool-shaft and clutch prevents vibration from originating in them the floating capacity of the driving member not only dissipates vibration of the pulley but overcomes difficulties that would otherwise arise from changes in the relationship of the shaft and pulley, due to wearing of the bearings of one or the other.

A further object of the invention is to provide improved clutch-controlling means having features that are particularly advantageous for use at high speeds (the clutch shown being combined with a shaft that usually runs at a speed exceeding 8,000 R. P. M.) without sacrificing in any degree its utility for relatively slow-speed clutches. Accordingly one feature of the invention consists in clutch-controlling means constructed and arranged to disconnect itself from contact with the rotating elements in consequence of coupling the clutch, thus eliminating all friction and a common cause of imperfect balance that would otherwise add to the driven load if it remained connected while the clutch was coupled. Preferably, and as shown, the controlling means is constructed to exercise its controlling functions through the agency of friction, and to apply the friction with considerable retarding effect on the shaft incidentally to disconnecting the clutch. The controlling means thus establishes a braking relation as a condition necessary to establishing a clutch-controlling connection.

Another feature of the invention consists in arranging the braking elements so that they will be instantaneously disconnected one from the other in consequence of establishing driving engagement of the driving and driven elements of the clutch.

Other objects and features of the invention are shown by the accompanying drawings and are hereinafter described and claimed.

Referring to the drawings.

Figure 1:
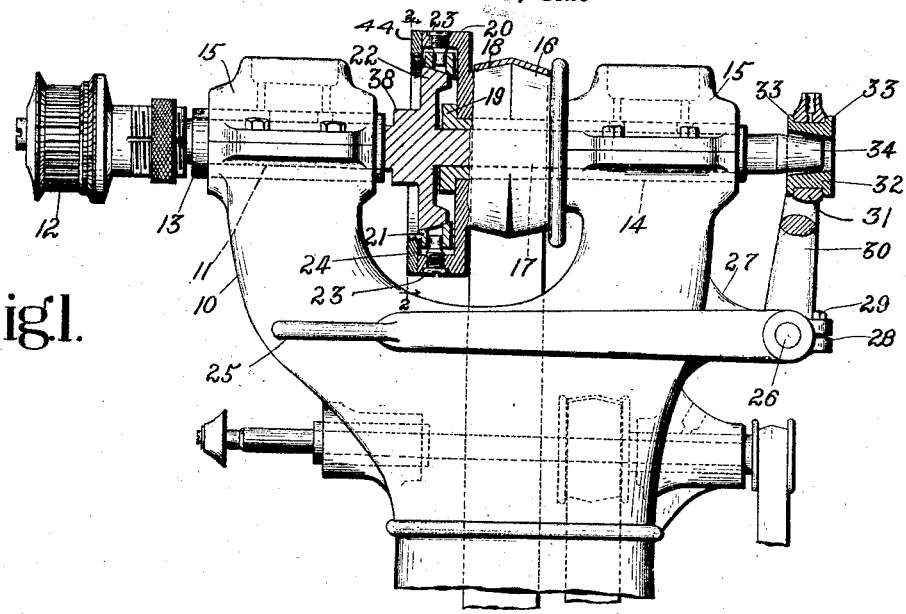
Fig. 1 represents a side elevation of a machine having a rotary tool-shaft and driving mechanism therefor constructed and arranged in accordance with this invention.
Figure 2:
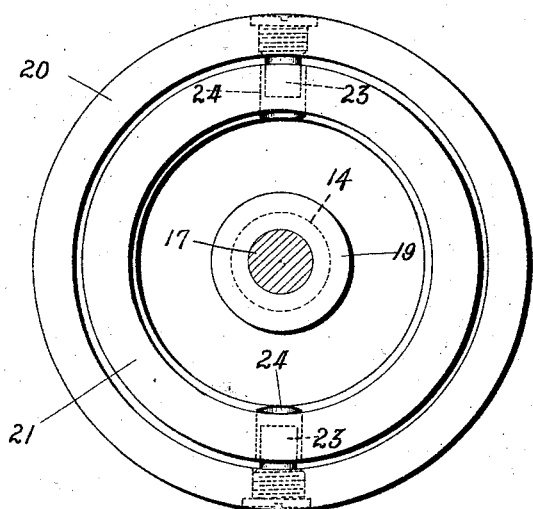
Fig. 2 represents on a larger scale an end elevation of elements of the transmission means by which pulsations are dissipated and by which compensation is made for eccentricity of the shaft relatively to the rotary driving member associated therewith.
Figure 3:
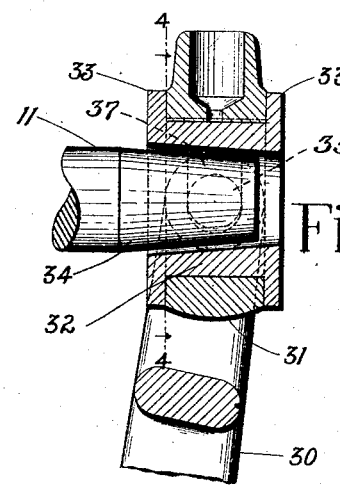
Fig. 3 represents a vertical section on a larger scale of the driving elements appearing at the upper right of Fig. 1.

The frame of the machine is indicated at 10 and a rotary tool-shaft is indicated at 11. In accordance with the intended purpose of the machine shown a tool 12 carried by the shaft 11 is of a form adapted to trim the edge of a shoe-sole. The shaft 11 as shown is journaled in bushings 13 and 14, the latter, for reasons that will be clear, being hereinafter termed a sleeve. These bearing members 13 and 14 are affixed to the frame by the clamping action of detachable caps 15, 15 bolted to the frame in the manner customary with split journal-boxes.

The receiving pulley 16, instead of being mounted on and supported by the shaft as heretofore, is mounted directly on a portion of the sleeve 14 that projects from the split journal-box in which the sleeve is clamped. Consequently the pulley is sustained by the sleeve 14 and the frame 10 without imposing any load whatsoever upon the shaft, although, as shown, the righthand portion 17 of the shaft extends through the pulley and through the sleeve, and projects beyond the right-hand end of the latter. Since the pulley is sustained independently of the shaft the latter will not be subjected to pulsations or vibrations imparted to or arising in the pulley. Such pulsations and vibrations would, according to prior constructions, be transmitted to the tool-shaft, but since the pulley is in the present instance supported by the sleeve 14 independently of the tool-shaft they are dissipated or absorbed partly by the sleeve and partly by the frame of the machine without being communicated to the tool-shaft. They are further dissipated or absorbed by the two films of lubricant that separate the pulley and the shaft from actual metal-to-metal contact with the sleeve and act as cushions to isolate the shaft from the source of vibration. Although the pulley is subjected to transverse stress by the belt 18 and to transverse pulsations by the belt-lacing or other coupling by which the ends of the belt are joined, the above-described mounting of the pulley and shaft avoids transmission of such stress and pulsations to the shaft.

The sleeve 14 as shown is provided with a flange 19 at its left-hand end to confine the pulley against endwise movement. When the cap 15 is loose the sleeve may be adjusted endwise so as to locate the flange 19 according to the length of the hub portion of the pulley. The pulley is provided with an annular flange 20 that forms a housing for the disconnectible clutch. This clutch, as shown, comprises cooperative conical friction elements one of which, indicated at 21, is a floating ring of suitable friction material such as compressed fiber and the other of which, indicated at 22, is a member formed on the shaft 11. The integral construction of the shaft and the member 22, while not necessary in every case, is preferable for shafts that rotate at exceedingly high speed because it avoids certain causes of inaccuracy with respect to the balancing of the shaft. In any event, the balanced rotary unit comprises the shaft 11, the tool 12 and any other elements rigidly fastened to the shaft to turn with it. As shown, the driven member 22 of the clutch is a part of the balanced unit. The ring 21 is carried rotatively by the pulley but is loose relatively to the pulley in other respects, particularly with respect to relative movement transversely of the axis of rotation. The connecting means shown by the drawing comprises screw studs 23 affixed to the flange 20 and extending radially into sockets 24 formed in the ring, the diameter of the sockets being considerably greater than that of the stud portions that occupy them. The ring is, therefore, free to move to a limited extent relatively to the studs in every direction, the connection being in effect a universal joint. The ring, while constituting the driving member of a friction clutch, is thus free to center itself or otherwise accommodate itself to the driven clutch member 22 without being subjected to any undue stress or binding that would otherwise arise from inaccuracy with respect to parallelism of the pulley and the shaft, or from eccentricity of the pulley and the shaft, or from inaccuracy in the ring itself.

The ring 21 is preferably symmetrical to preserve the balance of the shaft when the clutch is coupled. It is also preferably confined by a metallic ring 44 affixed to the left-hand edge of the flange 20. The described construction is such that the driving unit, comprising the pulley 16, the flange 20, studs 23 and ring 44, is separate and distinct from the balanced unit above described.

The clutch members are coupled and uncoupled by relative movement of the shaft and pulley lengthwise of the axis of rotation, provision being made in the illustrated machine for lengthwise movement of the shaft, since the pulley is restrained against endwise movement. The illustrated machine also includes clutch controlling means the controller of which is indicated at 25. This controller is in the form of a lever and is affixed to a rockshaft 26. The rockshaft extends through and bears in a bracket 27, the bearing portion of the bracket being split as indicated at 28 and being provided with a clamping bolt 29 by which it may be set up more or less tightly to maintain sufficient friction on the rockshaft to hold the latter in any position to which it may be moved. A yoke arm 30 carried by the rockshaft carries a split collar 31 which acts as a shipper to couple and uncouple the clutch and also to apply a braking action to the shaft 11. The collar 31 is occupied by a bushing 32 having flanges 33 at its ends to keep it in place. This bushing is free to rotate relatively to the collar 31 and is to all intents and purposes a brake shoe. When in operation it co-operates with a frustoconical portion 34 formed on the shaft, and in order to function with the desired effect it is internally tapered according to the conicity of the portion 34. For a purpose hereinafter explained the conicity of the elements 32 and 34 is not so steep as that of the clutch elements 21 and 22.

Figure 4:
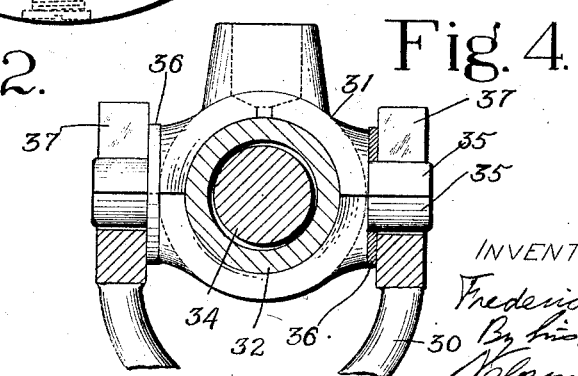
Fig. 4 represents a sectional view through the structure intersected by line 4—4 of Fig. 3.

As shown by Fig. 4 the collar 31 is split in a radial plane so that its two parts may be assembled between the flanges of the brake shoe, and the two halves of the collar are provided with semi-cylindric trunnion portions 35 in order to provide for operative connection with the yoke 30. After the two halves of the collar have been assembled on the brake shoe they are locked against separation by slipping metallic washers 36 on the trunnions. The assemblage is then mounted in the yoke 30 by introducing the trunnions laterally into radially extending sockets 37 formed in the arms of the yoke, said sockets being open at their outer ends. When the brake shoe is brought into telescopic relation with the end of the shaft as shown, the latter is effective to prevent the trunnions from being dislodged from the sockets 37, and the sockets permit the brake shoe and the split collar to follow a rectilinear course with the shaft, notwithstanding the fact that the movement of the yoke 30 is concentric to the axis of shaft 26.

In operation, assuming that the pulley 16 is rotated and that the clutch is connected as shown, the tool-shaft 11 may be brought quickly to a state of rest by depressing the controller 25. The first result of depressing the controller is to move the brake shoe 32 into braking relation to the portion 34 of the shaft. This causes the brake shoe to grip the shaft tightly because the conicity of the contacting surfaces is very slight. The brake shoe thus becomes an additional load on the shaft not so much because of its weight as because of the retarding effect of its connection with the non-rotatable collar 31. Continued downward movement of the controller moves the tool-shaft toward the left, thus disengaging the driven clutch member 22 from the driving clutch member 21. To all intents and purposes engaging of the braking elements and the disengaging of the clutch elements is instantaneous although, as a matter of fact, engaging of the braking elements is necessarily a condition precedent to the uncoupling of the clutch elements. However, the second phase of the operation follows so quickly upon the establishing of the braking relation that no bad effect results from the technical overlapping of these two phases. Any desired provision may be made for limiting endwise movement of the shaft, the left-hand bushing 13 in the illustrative machine serving as a stop in conjunction with a shoulder 38 formed on the shaft. By maintaining slight downward pressure on the controller 25 after the endwise movement of the shaft has been arrested the braking effect of the brake elements is greatly amplified with the result that the shaft, being now disconnected from the source of motion, is brought quickly to a state of rest with the brake shoe still tightly wedged on the conical portion 34 of the shaft. It is to be noted that although the coaction of the brake shoe and the portion 34 is frictional so far as their braking effect is concerned, it is positive with respect to disconnecting the clutching elements.

So long as the pulley 16 continues to rotate while disconnected from the tool-shaft its wearing effect will be sustained by the sleeve 14 but not by the tool-shaft. Consequently no matter to how great extent this wearing continues the tool-shaft will not be worn thereby and the accuracy of balance of the shaft will not be impaired. In time the upper side of the sleeve 14 will be worn by the pulley with the result that the pulley will gradually descend relatively to the shaft. The relative shifting of the axes of the pulley and the shaft due to such wearing will not have any bad effect on the shaft or on the clutch because the loose connection between the ring 21 and the pulley avoids the transmission of all stress transversely of the axis of the shaft.

The act of moving the controller 25 upwardly couples the clutch as a condition precedent to uncoupling the brake elements. When the tool shaft is moving to the right it is not rotating but is gripped by the brake shoe 32, and it is to be noted that in this respect the control of the clutch is exercised, not positively as in the first instance, but frictionally through the agency of the friction braking surface. The shaft continues to move to the right with the brake shoe until it is arrested by the coupling of the clutch members and if the latter are forced together quickly the sudden rotary motion imparted to the shaft shakes off the brake shoe because of the inertia of the latter, and a slight additional upward movement of the controller carries the brake shoe entirely out of contact with the shaft. If, on the other hand, the controller 25 is moved so as to couple the clutch members slowly the brake shoes 32 will not be shaken off but will turn with the shaft, because its relatively gradual taper affords a strong hold. By maintaining a slight upward pressure on the controller while the shaft is accelerating, the clutch members may be held together until the speed of the shaft equals that of the pulley. Then, by imparting an additional upward movement to the controller the clutching effect may be tightened and the shoe 32 finally separated from the cone portion 34 of the shaft. Physical connection between the controlling means and the shaft is thus completely ruptured and all unnecessary load is thus removed from the shaft so that the latter may be better adapted to rotate at the extremely high speed for which it is intended.

It has been stated herein that the conicity of the braking members is preferably not so steep as that of the clutch members. This is to insure coupling the clutch members with sufficient force to maintain their coupled relation before the brake members become uncoupled. It will be understood, of course, that the conicity of the clutch members will be determined according to conditions so that they will maintain their driving relation frictionally when once such relation has been established by the starting movement hereinbefore described.

Having thus described my invention, what I claim as new and desire to secure by Letters Patent of the United States is:

1. The combination comprising a driving unit and a driven unit supported independently of each other in substantially coaxial relation and capable of relative axial movement, said driven unit including a tool and being in true balance to rotate at high speed without generating vibration, one of said units having an integral clutch element, and a clutch member loosely connected to the other one of said units to cooperate with said integral clutch element and to be clutched and declutched by relative axial movement of said units.

2. The combination comprising a driving unit and a driven unit supported independently of each other in substantially coaxial relation, said driven unit being in true balance and including a shaft, a tool and an integral clutch element, and a clutch member loosely connected to said driving unit to cooperate with said integral clutch element, and means for causing relative axial movement of said units to effect clutching.

3. The combination with a receiving pulley and a tool-shaft extending therethrough, of means arranged to sustain them independently of each other, and means arranged to transmit rotation from said pulley to said shaft and dissipate vibration affecting the pulley, said shaft being in balance to rotate without producing vibration.

4. The combination with a longitudinally movable and rotary shaft, of a rotary transmission member in coaxial relation to the shaft, frictional transmission means arranged to transmit rotation from said rotary member to the shaft and controllable by endwise movement of the latter, and controlling means constructed and arranged to act on the shaft positively so as to move the latter longitudinally in one direction and to act frictionally thereon so as to move the shaft longitudinally in the opposite direction.

5. The combination with a rotary transmission member and a rotary shaft arranged in coaxial relation so as to be capable of relative axial movement, of disconnectible transmission means arranged to transmit rotation from said member to the shaft, and controlling means constructed and arranged to act positively so as to disconnect said transmission means and to act frictionally so as to establish driving connection through the latter.

6. The combination with co-operative friction clutch elements arranged to be engaged and disengaged by relative movement of the driven element lengthwise of its axis, and controlling means including an internally tapering member and an externally tapering member one of which is rigidly related to the driven member of the clutch and the other one of which is movably mounted and arranged to act frictionally on the rigidly related one so as to engage the driven element of the clutch with the driving element thereof and to rotate therewith.

7. The combination with an internal friction cone clutch member and an external friction cone clutch member constructed and arranged to be engaged with and disengaged from each other by relative endwise movement, of controlling means including internal and external cone elements arranged to be engaged and disengaged by relative axial movement and to couple and rotate in unison with said clutch members.

8. The combination with disconnectible friction clutch members, of controlling means therefor comprising co-operative members constructed and arranged to couple said clutch members, to rotate in unison with the latter and to free themselves one from the other in consequence of tightening the clutched relation of the clutch members.

9. The combination with disconnectible conical friction clutch members, of controlling means therefor including disconnectible friction members arranged to couple the clutch members as a condition precedent to uncoupling themselves.

10. The combination with disconnectible conical friction clutch members, of controlling means therefor including disconnectible conical friction members formed and arranged so that the frictional resistance to their separation will couple the clutch members, the conicity of the latter being steeper than that of said controlling members.

11. The combination with disconnectible conical friction clutch members, of controlling means therefor including disconnectible conical and coaxial friction members arranged to shift one of the clutch members axially, and including operating means by which one of said controlling members is carried and in which it is swiveled.

12. The combination with a rotary tool-shaft having a tapering portion, of a disconnectible clutch for driving the same and clutch-controlling means including a frictional brake arranged to act on said tapering portion of the shaft and to transmit controlling movement to the clutch by or through the braking action on the shaft.

13. The combination with an assemblage of rotary elements including disconnectible friction clutch members adapted to maintain their hold one upon another, of controlling means including a movable member arranged and adapted to apply initially light clutching stress, to maintain such stress while the driven element of the clutch is accelerating, and thereafter by moving in one direction to apply greater clutching stress and free itself from contact with said assemblage.

14. A machine comprising an axially movable tool-shaft having a conical portion, a shipper therefor, an internally tapered friction member carried by said shipper to act on said conical portion so as to shift said shaft positively in one direction and frictionally in the opposite direction, said internally tapered member being rotatable relatively to said shipper, and a friction clutch arranged to be coupled with and uncoupled from said shaft by the axial movement imparted to the shaft by said internally tapered member.

15. A machine comprising an axially movable tool-shaft having a conical portion, a shipper therefor, an internally tapered friction member carried by said shipper to act on said conical portion so as to shift said shaft positively in one direction and frictionally in the opposite direction, said internally tapered member being loose relatively to said shipper so as to center itself relatively to said conical portion of the shaft, and a friction clutch arranged to be coupled with and uncoupled from said shaft by the axial movement imparted to the shaft by said internally tapered member.

In testimony whereof I have signed my name to this specification.

FREDERICK M. FURBER.